Patented Aug. 5, 1924.

1,503,640

UNITED STATES PATENT OFFICE.

CHARLES E. CURTISS, OF CLEVELAND HEIGHTS, AND HARRY L. ALLEN, OF CLEVELAND, OHIO, ASSIGNORS TO THE BRUCE-MACBETH ENGINE COMPANY, OF CLEVELAND, OHIO, A CORPORATION OF OHIO.

INTERNAL-COMBUSTION ENGINE.

Application filed December 21, 1921. Serial No. 523,840.

*To all whom it may concern:*

Be it known that we, CHARLES E. CURTISS and HARRY L. ALLEN, citizens of the United States, residents of Cleveland Heights, county of Cuyahoga, and State of Ohio, and Cleveland, county of Cuyahoga, and State of Ohio, respectively, have invented new and useful Improvements in Internal-Combustion Engines, of which the following is a specification, the principle of the invention being herein explained and the best mode in which we have contemplated applying that principle, so as to distinguish it from other inventions.

This invention relates to internal combustion engines, more particularly to an improved means for cooling the cylinders.

It is an object of the present invention to provide a water cooling system which makes possible the eliminating of the water jackets forming a part of the usual cylinder head and body construction and also the water jackets for the valve cages and exhaust manifold commonly used.

A further object is to provide a water cooling system which permits ready access to the cylinder and head for cleaning or repair.

A further object is to provide a water cooling system in which steam or air pockets cannot form, and in which all parts of the cylinder body and head are maintained at a substantially uniform temperature.

Further objects will appear from the following description and the annexed drawings.

In the annexed drawings and following description we have set forth in detail certain means embodying our invention, the disclosed means, however, constituting but one of the various mechanical forms in which the principle of the invention may be employed.

Figure 1:
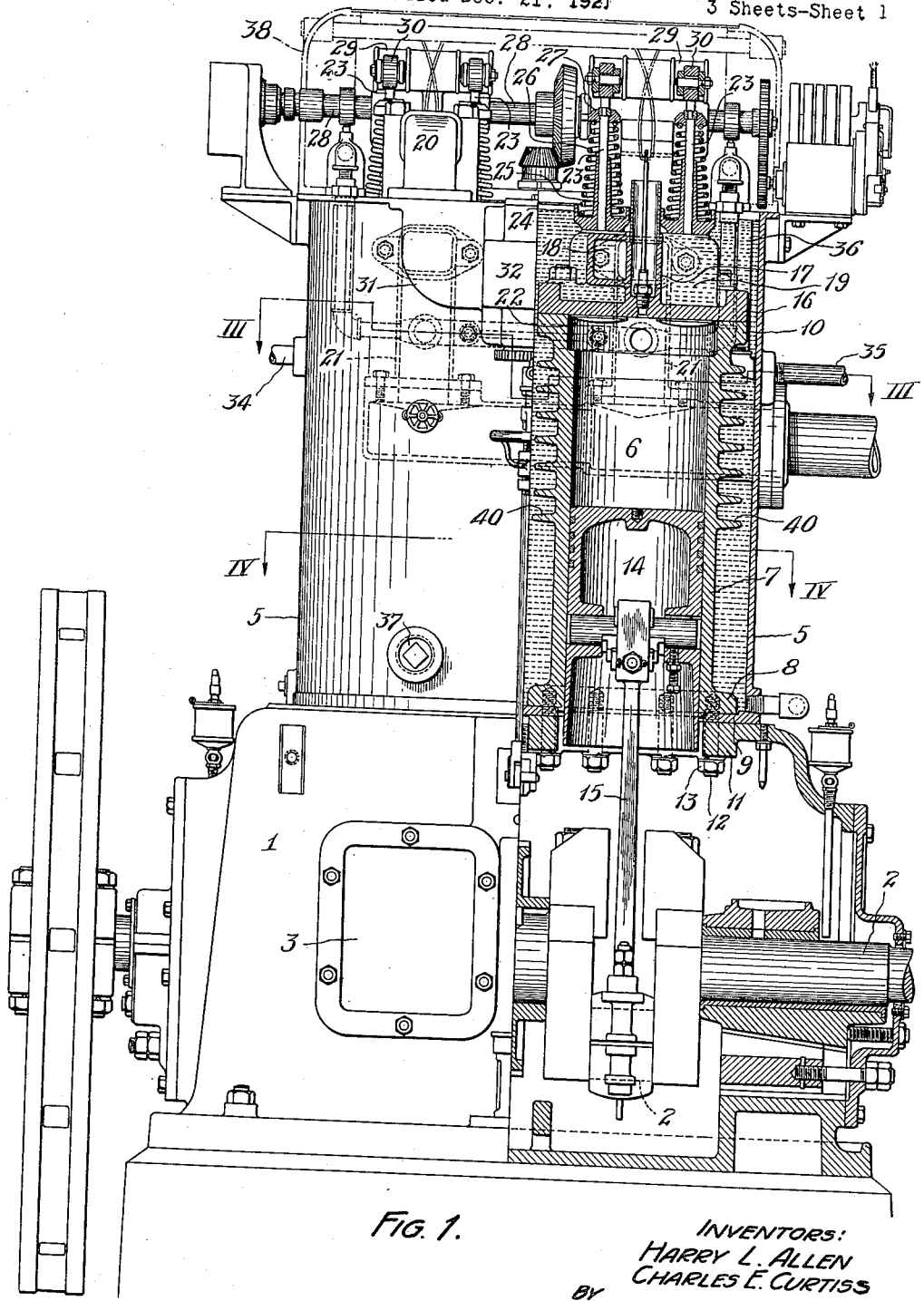
Fig. 1 is a view showing one half of the engine in front elevation with the platform removed and a section on a central transverse vertical plane through the other half.
Figure 2:
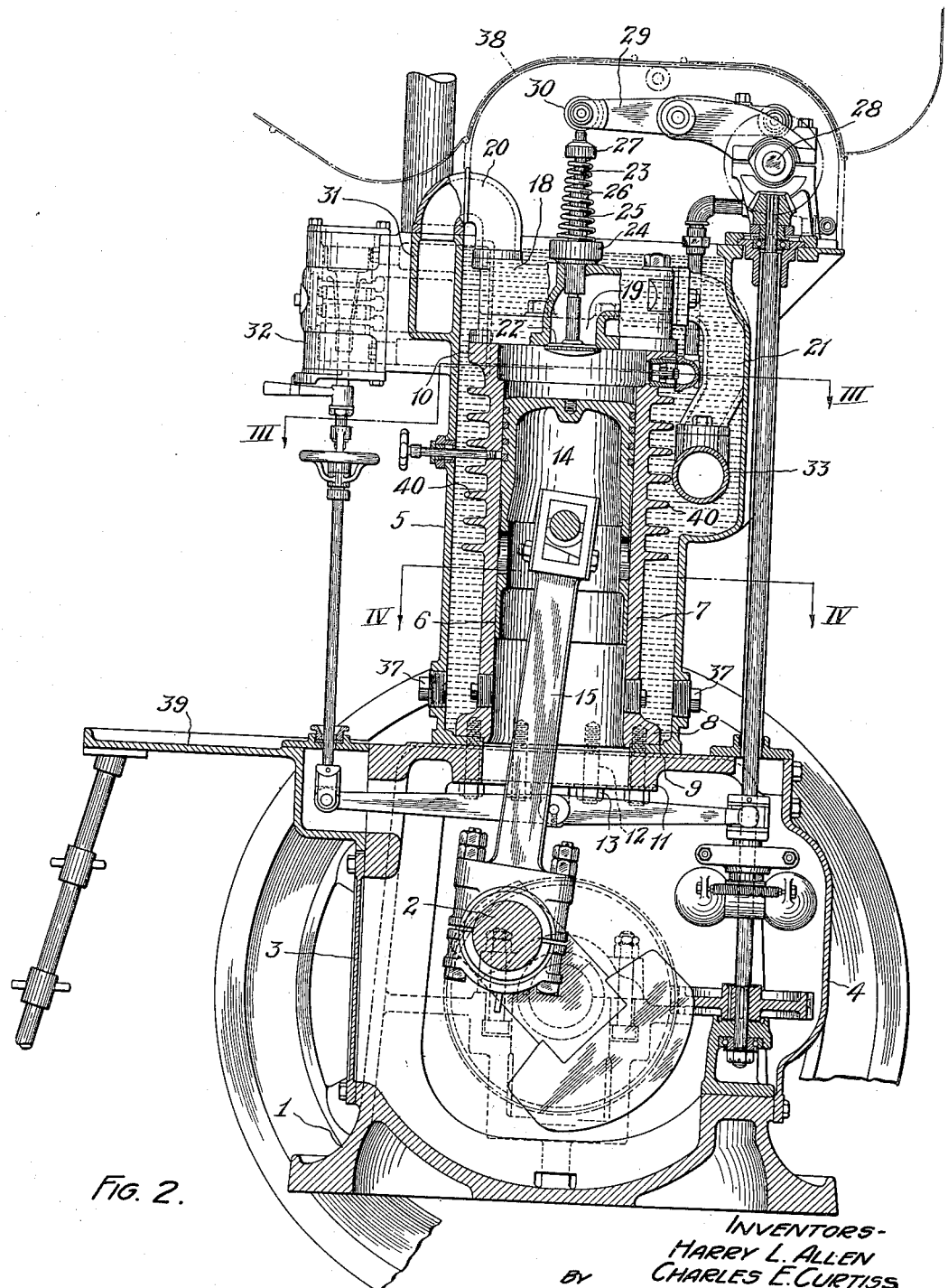
Fig. 2 is a vertical section of the entire engine.
Figure 3:
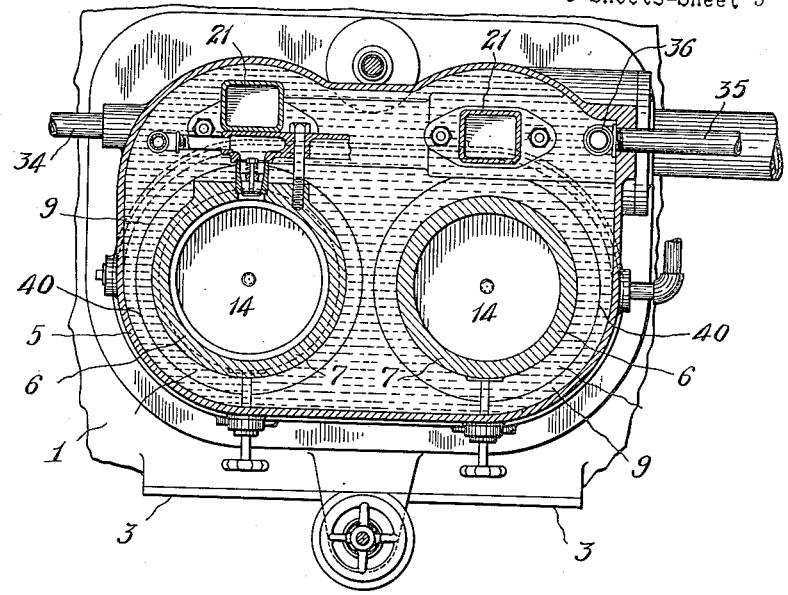
Fig. 3 is a section on line III—III of Fig. 2.
Figure 4:
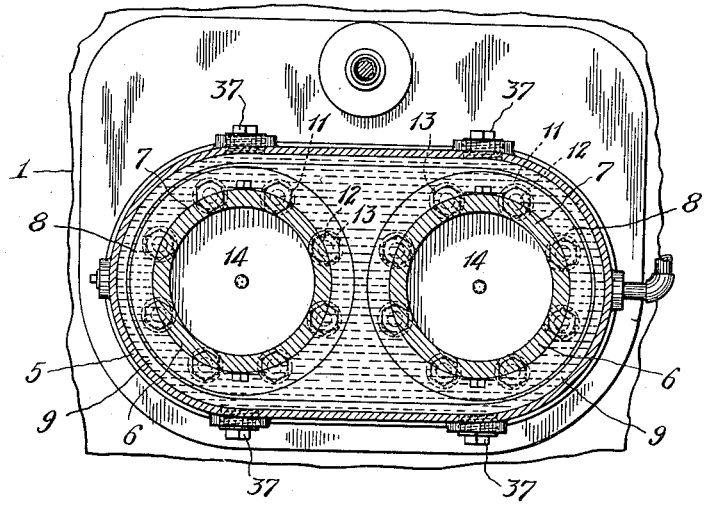
Fig. 4 is a section on line IV—IV of Fig. 2.

There are certain disadvantages inherent in the usual water jacket cooling systems employed for cooling the cylinders and valves of internal combustion engines. One of the most serious defects of such systems is the difficulty of maintaining the proper circulation of water due to the clogging of the passages with rust, scale and other sediment.

Furthermore, any retardation of the circulation of water caused either by clogging of the passages or failure of the water supplying means will result in the formation of steam or air pockets in the water jacket causing local heating, distortion and often cracking of the cylinder wall. A further disadvantage is the formation of scale on the walls of the cylinder body and head and valve cages, which reduces the heat conductivity of these parts and results in overheating. A further disadvantage is that the dismantling and cleaning of such water jacket cylinders is a complicated and tedious operation. It is the purpose of the present invention to eliminate or minimize the disadvantages above mentioned in water cooling systems by submerging the cylinder and head in an open tank of water, whereby restricted passages, liable to become clogged and to retard the circulation of the water, are eliminated; whereby the water cannot be subjected to pressure greater than atmospheric pressure even though the circulation thereof should be stopped and the formation of steam or air pockets and consequent local heating of any portion of the cylinder is impossible; and whereby all parts of the cylinder body and head are maintained at substantially the same temperature. The elimination of the water jackets in the body and head of the cylinder greatly simplifies the structure of these parts. The cylinders are readily accessible from the open top of the tank for cleaning or repairs and are detachably secured to the bottom of the tank so that they can be bodily removed when desired.

Referring to the annexed drawings in which we have shown an engine of the vertical multiple cylinder type, the engine is mounted on a crank case 1, of the usual construction, having a crank shaft 2 journaled therein, provided with the usual detachable covers 3 and 4 at the front and rear thereof, and carrying on the top thereof an open top tank 5 in which are mounted the engine cylinders 6. The body portion of each of the cylinders 6 consists of a plain cylindrical casting 7 having base flanges 8 resting on the bottom 9 of the tank 5 and top flanges 10 to which the cylinder head is bolted. The bottom 9 of the tank 5 has circular openings with which the lower open ends of the cylinder 6 register. The top of the crank case has openings registering with the openings in the bottom of the tank which are surrounded by marginal bosses 11 on the under side thereof. The tank 5 and cylinders 6 are secured in place by studs 12 having nuts 13 at their lower ends and passing through the bosses 11, bottom 9 and threaded into the base flange 8 of the cylinder body 7. The studs 12 are accessible from within the crank case whereby the cylinders 6 can be readily detached when desired. Working in the cylinders 6 are the usual pistons 14 connected to the crank shaft by connecting rods 15.

The cylinder head consists of a casting 16 bolted to the upper flanges 10 of the cylinder body 7. The casting 16 has central spark plug receiving wells 17 having a sleeve portion projecting upwardly from the head to above the water level of the tank. On opposite sides of the spark plug wells 17, the casting 16 has gas inlet and outlet passages, 18 and 19 formed therein and communicating with the interior of the cylinder 6 and with the inlet and exhaust pipes 20 and 21, respectively. The inlet and outlet passages are controlled by poppet valves 22. The stems 23 of the poppet valves 22 extend upwardly through valve cages 24 seated in the casting 16. The cages 24 have upwardly extending sleeves 25 to form an extended bearing for the valve stem and the valves 22 are held against their seats by compression coil springs 26 surrounding the stems 23 and sleeves 25 and bearing at their lower ends upon the cages 24 and at their upper ends against the collars 27 fixed to the stems 23. For operating the valves 22, a cam shaft 28 is journaled in bearings attached to the upper edge of the tank 5. The cam shaft 28 is driven by suitable gearing from the crank shaft of the engine. A series of cams on the cam shaft 28 engage arms 29 pivoted to brackets fixed to the upper edge of the tank and carrying rollers 30 at their outer ends engaging the upper ends of the valve stems 23.

The inlet pipes 20 are detachably secured to the top of the casting 16 and to a fuel inlet manifold 31 cast integral with the upper edge of the tank 5 to which is connected the governor controlled mixing valve 32. The exhaust pipes 21 are detachably secured to the sides of the castings 16 and to a horizontal exhaust manifold 33 back of the cylinders 6 and within the tank 5. The pipes 20 and 21 and also the arms 29 are readily detachable to permit the cylinders 6 to be bodily removed from the tank 5 for cleaning or repair.

The tank 5 is provided with a water inlet pipe 34 and an overflow pipe 35. A vertical open ended pipe 36 within the tank communicates with the overflow pipe 35 and has its upper open end disposed at the level at which it is desired to maintain the water in the tank. Drain plugs 37 are provided adjacent the bottom of the tank.

A detachable cover 38 may be secured to the top of the tank, and the usual operator's platform 39 on a level with the top of the crank case is detachably secured to the front of the latter.

The cylindrical castings 7 forming the body portions of the cylinders is preferably provided with circumferential heat radiating fins 40 such as are commonly provided on the cylinders of air cooled engines. The use of such fins in connection with a water cooling system is made possible by the mounting of the cylinders within the tank 5.

The water in the tank may be maintained at any desired temperature up to the boiling point by regulating the flow of water into such tank. Any steam formed in the tank passes readily to the atmosphere at the open top of the tank and all parts of the cylinders are necessarily maintained at a substantially uniform temperature. The exhaust gases are cooled by the same water that cools the cylinders. The construction of the engine is greatly simplified and cheapened by eliminating the water jackets for the cylinder body, cylinder head and exhaust.

Having fully described our invention what we claim and desire to secure by Letters Patent is:

1. In an internal combustion engine, the combination of an engine crank-case; a tank mounted thereon; an engine cylinder within said tank and communicating with the said crank case; a liquid-supply inlet connected with said tank; and a liquid outlet for said tank and having its opening located above the head of said cylinder.

2. In an internal combustion engine, the combination of an engine crank-case having an opening in its top; a tank having an open top and mounted upon the latter; an engine cylinder within said tank having its open end detachably secured adjacent to said crank-case opening; means for supplying liquid to said tank; and means for maintaining the level of said liquid above the head of the cylinder.

3. In an internal combustion engine, the combination with the engine crank case; of a tank having an open top mounted on said crank case; an engine cylinder having its open end detachably secured to the bottom of said tank, said bottom having an opening registering with the open end of said cylinder; means for supplying liquid to said tank; and means for maintaining the level of said liquid above the head of said cylinder.

4. In an internal combustion engine, a crank case; a tank mounted on the latter open at its top; an engine cylinder mounted on said crank case in the tank, of less height than and independently of said tank, said cylinder being receivable through the top of the latter without disturbing the mounting thereof; and means for securing the cylinder to the crank case and being releasable from the cylinder in such wise as to permit positioning and removal of the cylinder without disturbing the position of the tank.

5. In an internal combustion engine, a crank case; a tank open at its top, means for securing said tank to the crank case; a plurality of cylinders immersed in the tank; and securing means between the crank case and the cylinders for securing same in such position as to permit removal of the cylinders from the crank case without disturbing the position of said tank; said cylinders being removable through the open top of the latter without disturbing the position thereof.

6. In an internal combustion engine, a tank open at its top; a plurality of engine cylinders submerged in said tank; and securing means on the crank case for and releasable from the cylinders to free the same for removal without disturbing the position of the tank; said cylinders being adapted to be removed and positioned through the top of the latter without disturbing the position thereof.

7. In an internal combustion engine, the combination of an engine crank case; a tank mounted thereon; a crank shaft in said case; an engine cylinder mounted in said tank and communicating with said crank case; means for maintaining the level of the liquid in said tank above the cylinder head; cylinder inlet and exhaust valves mounted in said head, the stems of said valves extending above the level of the liquid; a cam shaft mounted upon the upper edge of the tank; valve actuating arms engageable with said cams and the valve stems; and means for driving said cam shaft from said crank shaft.

8. In an internal combustion engine, the combination of a crank-case provided with an opening at its top; a tank mounted upon said crank-case; an engine cylinder in said tank having a lower open end communicating with the interior of said crank-case; and bolts accessible from within the latter for removably securing said cylinder in place in said tank.

9. In an internal combustion engine; the combination of a crank case; a tank having a circular opening in its bottom mounted on said crank case; an engine cylinder having a lower open flanged end registering with opening; and bolts accessible from within said crank case and engaging the flange of the cylinder for securing said cylinder in place in said tank.

10. In a vertical multiple cylinder internal combustion engine; the combination with the engine crank case; of a tank mounted thereon; cylinders mounted within said tank and communicating with said crank case; means accessible from within said crank case for detachably securing said cylinders in place; and means for maintaining the level of the liquid in said tank above the heads of said cylinders.

11. In a vertical multiple cylinder internal combustion engine; the combination with the engine crank case; of a tank mounted thereon; engine cylinders mounted within said tank and communicating with said crank case; means for maintaining the level of the liquid in the tank above the cylinder heads; a fuel inlet manifold carried by the upper edges of the tank; and conduits connecting said manifold with the cylinder heads.

12. In a vertical multiple cylinder internal combustion engine, the combination with the engine crank case; of a tank mounted thereon; engine cylinders mounted within said tank and communicating with said crank case; means for maintaining the level of the liquid in the tank above the cylinder heads; a fuel inlet manifold carried by the upper edges of the tank; conduits connecting said manifold with the cylinder heads; an exhaust manifold within said tank below the level of the liquid therein; conduits connecting said heads with said manifold; valves for controlling the inlet and exhaust ports of the heads, the stems of said valves projecting above the surface of the liquid in the tank; and valve operating mechanism carried by said tank and engageable with said stems.

Signed by use this 23rd day of November, 1921.

CHARLES E. CURTISS.
HARRY L. ALLEN.